May 12, 1970   F. K. MESEK   3,511,382
DEVICE FOR DETECTION OF ABNORMAL MILK
Filed May 22, 1967

INVENTOR
FREDERICK K. MESEK
BY Nicholas A. Gallo III
ATTORNEY

United States Patent Office 3,511,382
Patented May 12, 1970

3,511,382
DEVICE FOR DETECTION OF ABNORMAL MILK
Frederick K. Mesek, Downers Grove, Ill., assignor to Johnson & Johnson, a corporation of New Jersey
Filed May 22, 1967, Ser. No. 640,021
Int. Cl. B01d 25/04
U.S. Cl. 210—489                                    1 Claim

ABSTRACT OF THE DISCLOSURE

The preferred filter media described consists of a first filter zone having a fiber weight of about 250 grains per square yard and formed of cellulosic fibers having a denier of about 15, followed by a second filter zone having a fiber weight of about 1.5 ounces per square yard and formed of cotton fibers having a weight of 5.5 micrograms per linear inch. The first zone filters out gross impurities in the milk but allows most of the pustules and flakes indicative of high leukocyte count in the milk to pass therethrough. The second zone acquires a yellow color when the milk containing the pustules and flakes are passed through the same. Because of the difference in fiber denier, the first zone and second zone are easily split apart so that the color of the surface of the second zone may be examined or compared to a standard to determine the leukocyte count in the milk.

BACKGROUND OF THE INVENTION

Figure 1:
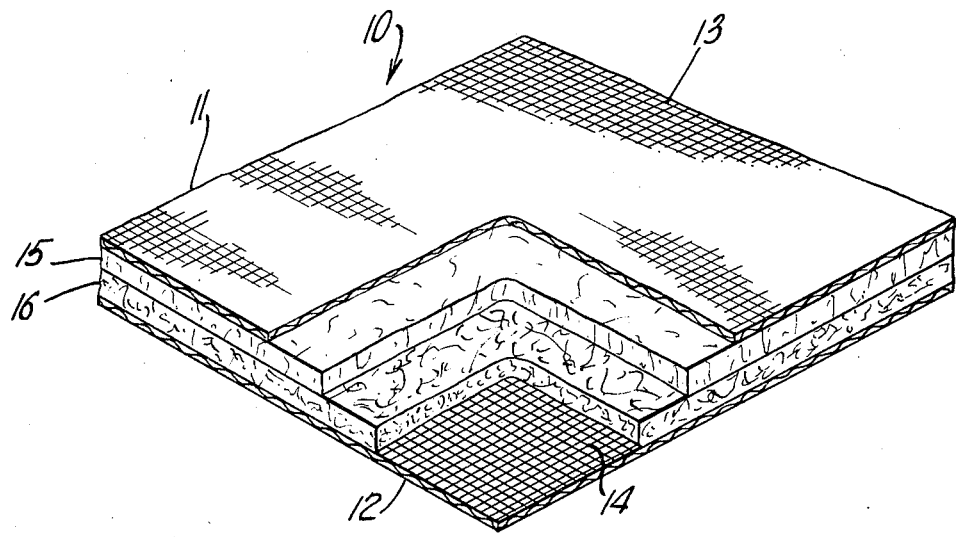

On most farms, even though dairy stock may be well cared for, a certain number of animals at any given time have various udder inflammations or traumas, the existence of which is reflected by a high leukocyte count in the milk obtained from these animals. These inflammations are usually referred to collectively as "mastitis." While the leukocytes are not in themselves harmful, if the milk has a high leukocyte count, it cannot be sold.

Since udder inflammations are a common occurrence, some method must be provided to detect milk which has come from cows which, in fact, have mastitis. Present methods of detecting milk from cows with inflamed udders are generally complicated and laborious. Usually a sample of milk is withdrawn from the bulk tank and the leukocytes counted by one or more complicated direct or indirect techniques. If it is found that the leukocyte count is very high, that is, the cow's udder is badly inflamed, the entire tank of milk is discarded and the farmer still does not know which cow or group of cows has mastitis.

It is therefore not only desirable to find a simple and efficient method of detecting a high leukocyte count in milk in order to eliminate previously used complicated and time consuming procedures per se, but it is additionally desirable to find a method of detecting such milk which is so brief and simple that it may be economically used to screen the milk of each individual cow at the time of milking. If the milk obtained from each individual animal may be tested at the time of milking, if a high leukocyte count is detected, it will only be necessary to discard the milk obtained from that one cow. In addition, by detecting the abnormal milk at the time of milking, the farmer will be able to identify which of his cows at any given moment have inflamed udders and may then initiate selective treatment of only those cows.

It was recently discovered and reported in the literature that the yellow color sometimes acquired by the inlet surface of milk filters during filtration is evidence of a high leukocyte count in the milk and is derived from yellow-white gelatinous pustules or flakes in the milk. However, because of other gross foreign matter in the raw milk which is deposited on the inlet filter surface, this "discoloration" is extremely difficult to detect. If it were possible to relate the discoloration to the leukocyte count in the milk, and to do this at the time of milking, the farmer would be able to identify any cows which have mastitis.

THE INVENTION

According to this invention a method of detecting the existence of leukocytes in milk at the time of milking and suitably incidental to the normal first stage filtering of the milk is provided, as well as a device which may be utilized to carry out the method of detection.

Filter media characteristics are a function of both pore size and bed weight, and pore size itself is a function of fiber denier and bed weight. Pore size as the term is used herein is a fluid conducting passage passing completely through a fiber layer. The maximum pore size is the largest cross-sectional passage as determined by the smallest cross-sectional area of such a passage, and it is the smallest cross-sectional area of any passage that determines the actual fluid flow therethrough. The pore diameter may be determined by the standard test set forth in the Journal of the Textile Institute, May 16, 1954, on pages T371 through T389. However, for webs having a weight of much below 500 grains per square yard, an accurate determination of pore size is difficult to obtain. Therefore, the filter media of this invention are best, and adequately, defined in terms of bed weight and fiber denier.

Specifically then, according to this invention, a filter media is provided comprising an inlet fibrous zone and a following fibrous zone. The media also has a cleavage plane along the surface of or within the following fiber zone along which the filter may be easily and cleanly split after filtration of the milk, and while still wet, to provide visual access to a fiber surface of the following filter zone.

The inlet zone has a fiber weight of from about 100 grains per square yard to about 400 grains per square yard and is formed of fibers, usually synthetic, having a denier of from about 5 to about 20. The following fibrous zone is designed for much finer filtration and has a fiber weight of at least about 75 grains per square yard and is formed of fibers, usually cellulosic, having a denier of from about 1 to about 3.5.

In using the device described, the milk is passed through the same and the media then split along the cleavage plane. The first filter zone is coarse enough that the same will not plug excessively when the media is used in the first stage filtration of raw milk and is coarse enough and sufficiently light in weight that a major portion of the yellow-white gelatinous pustules and flakes that may be present in the milk will pass therethrough. On the other hand, this layer is fine enough that most of the gross impurities in the milk, other than the pustules and flakes referred to above, will be retained in the inlet filter zone. If the gross impurities were to pass through the first filter zone to any substantial degree, they would plug one of the other filter zones and if collected in the following fiber zone adjacent the cleavage plane, they would often sufficiently obscure the fibers in this zone adjacent the plane that a visual determination of the leukocyte level in the milk would not be possible.

While the first filter zone may have a fiber weight and average fiber denier within the earlier described limits, superior results are obtained if fibers having a denier of between about 12 and about 18 are used and/or if the inlet layer has a fiber weight of between about 150 and 250 grains per square yard. Best results are obtained if both these parameters are within these limits. The fibers used to form the inlet zone may be made of any nontoxic material not dissolved by the milk and including, for example, rayon, Dynel, and the like.

The following filter zone is designed to acquire a discernible yellow color when milk containing the yellow-white pustules and flakes heretofore described is passed therethrough. The mechanism involved in the following filter zone acquiring the yellow color is not known but it is thought to be either a filtering out of the earlier described pustules by impingement or a discoloration of the fibers through contact with these particles. Thus, if the following filter zone has an average fiber denier and bed weight within the heretofore described limits, the zone will be dense enough that (1) sufficient contact between fibers and pustules will occur to impart the yellow color to the fibers, and (2) a sufficient amount of "yellowed" fibers will be present in a given surface area to provide a color intense enough for comparison with a standard, either visually or in a colorimeter, to determine whether or not the milk is sufficiently high in leukocytes to require that it be discarded.

Superior results are obtained where the following filter zone has a fiber weight of at least about 125 grains per square yard and/or is formed of fibers having a denier of between about 2 and about 3.

It is essential that the media, which is usually through bonded, be easily and cleanly splittable while still wet along some cleavage plane, preferably the interfacial surface between first filter zone and second filter zone. If accurate measurements and comparisons are to be obtained, it is essential that the plane of splitting be precisely known ahead of time so that appropriate controls may be set up and so that the samples compared are of standard weight, density, and fiber denier. For example, if splitting is designed to occur between the first and second zone, if a portion of the large denier fibers in the first filter zone remain adhered to the face of the second filter zone after splitting, these adhered fibers may effectively obscure the fibers in the second filter zone.

It has been found that easy and clean splitting occurs between two fibrous webs which are bonded together if the fibers in one of the webs have a denier of from about 2 to about 10 times the denier of the fibers in the second web. The higher this ratio, the easier and cleaner the splitting. Since as previously pointed out for the media to function properly as a detecting device, it is necessary that the pore size, and hence the denier of the fibers, for the first filter zone be substantially greater than the pore size, and hence the denier of the fibers, of the second filter zone, splitting may be provided in conjunction with the design of the remainder of the filter media, within the preferred limits heretofore set out.

Additional or alternate means to affect easy splitting and clean splitting of the filter media may of course be provided. For example, by carefully controlling the penetration of binder into the interfacial area between the two filter layers, a cleavage plane may be provided or a thin layer of large diameter fibers may be interposed within a zone of small diameter fibers. It may also be desirable to provide a tab in the marginal portion of the media between the two filter zones to facilitate the initiation of splitting.

The fiber layers and zones may be either wet formed or dry formed. If the web is dry formed, a binder will usually be necessary in order to stabilize the same. Any of the binders conventionally used and well known to those skilled in the art which are normally used in filter media may be used in the device of this invention.

Figure 2:
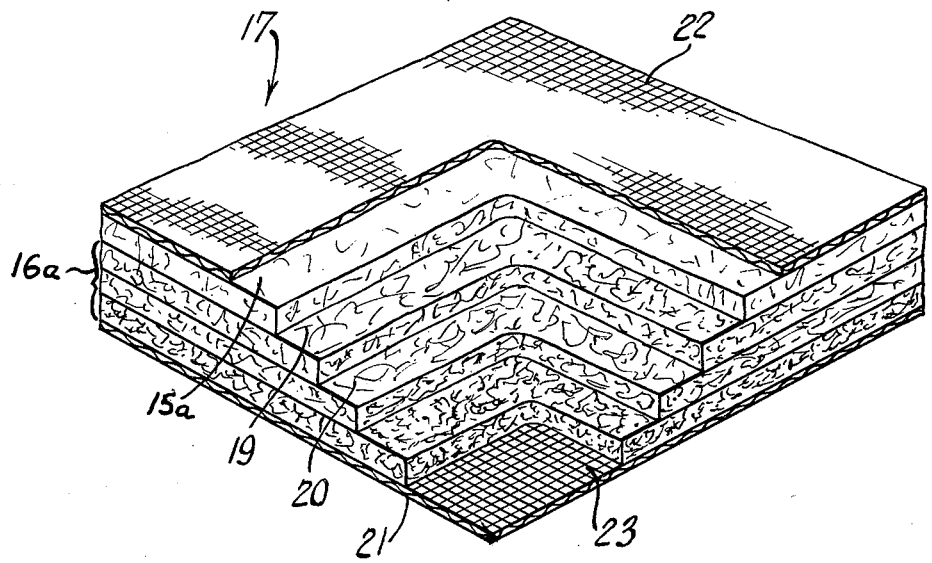

The invention will be more easily understood by reference to the attached drawings and the following descriptions thereof. In the drawings, FIG. 1 is an illustration of a media of this invention with portions broken away to show the different fiber zones;

FIG. 2 is a somewhat different construction of a filter media made in accordance with the present invention.

SPECIFIC EMBODIMENTS OF THE INVENTION

Referring now to FIG. 1, the filter media, 10, contains on its inlet side 11 and on its outlet side 12 outer protective coverings designated as 13 and 14. Outer covering 13 is formed of open mesh gauze about 14 x 10 thread count. The outer protective covering 14 is formed of a similar gauze. These coverings serve primarily to protect the filter media and give the same added strength in handling. The two gauze coverings are breakably sealed together outward of the central portion of the filter media, so that the two gauze coverings may be easily split apart when the filter media is split apart after use as later described.

On the inlet side of the filter next to the protective gauze covering, 13, is a 250 grain per square yard inlet filter zone or layer, 15, of 15 denier rayon fibers.

On the outlet side of the filter next to protective gauze covering, 14, is the following or second filter zone, 16, of much smaller pore size, formed of cotton fibers having a weight of 5.5 micrograms per linear inch at a bed weight of 1.5 ounces per square yard.

Referring now to FIG. 2, a second filter media of this invention is illustrated in which the following filter zone consists of a plurality of layers of progressively smaller pore size. Thus, in filter media 17, the first filter zone 15a adjacent inlet side 22 and protective gauze covering 24 is the same as that of the filter media of FIG. 1.

The second filter zone 16a of filter media 17 has a plurality of layers 19, 20 and 21. The first layer 19 consists of 0.50 ounce per square yard of 50/50 blend of 2 denier rayon and 3.5 microgram per linear inch cotton. The second layer 20 consists of 0.50 ounce per square yard of 2 denier rayon. The third zone 21 consists of 0.50 ounce per square yard of 3.5 microgram per linear inch cotton.

In the media illustrated, after the web for each zone is in turn laid and the composite media formed, the same is passed between two spaced horizontal rollers of a coating machine, each of which is wetted with an aqueous solution of polyvinyl alcohol adhesive of about 0.70 percent by weight concentration (preferably completely hydrolyzed, soluble in hot water and insoluble in cold water, having a viscosity of 55 to 85 centipoises by the Hoeppler falling ball method with 4% water solution cooled to 20° C.). The sheet is then dried by passing through a hot air oven.

When it is desired to use the filter media in the detection of abnormal milk, the same is placed in the milk strainer in the same manner as a conventional milk filter. A measured quantity of milk is passed through the filter. If each cow is to be tested, this quantity is suitably about 2.5 gallons since this is the quantity of milk obtained from a typical cow. It is also convenient to test milk from every 4 cows (every 10 gallons) since this is about the life of a filter of the type described.

After filtration has been completed, the filter media is removed and split along the heretofore mentioned cleavage plane. If the device is properly used, and if the cow has mastitis, the surface of the second filter zone will have acquired a pronounced yellow color. If this yellow color is sufficiently pronounced, the farmer will be able to determine immediately that that particular cow or group of cows has contracted infections known as mastitis. If there is any doubt, the color of the layer may be compared with any standard either visually or in a colorimeter to make the determination.

What is claimed is:

1. A filter media suitable for use in the filtration of raw milk and for simultaneous use as a device to detect leukocytes in milk, comprising:

(1) a first filter zone having a fiber weight of from about 100 to about 400 grains per square yard and being formed of fibers having a denier of from about 5 to about 20;

(2) a following filter zone having a fiber weight of at least about 75 grains per square yard and being formed of fibers having a denier of from about 1 to about 3.5;

(3) a thin layer of fibers having a diameter larger than the fibers in both said zones interposed between said zones to define a cleavage plane along which said filter media may be easily and cleanly split to provide visual access to a fiber surface of said following filter zone; and (4) tab means associated with a portion of said thin layer to facilitate the initiation of said splitting.

References Cited

UNITED STATES PATENTS

| | | | |
|---|---|---|---|
| 2,834,730 | 5/1958 | Painter et al. | 210—491 X |
| 3,003,643 | 10/1961 | Thomas | 210—491 |
| 3,276,597 | 10/1966 | Mesek et al. | 210—489 |

SAMIH N. ZAHARNA, Primary Examiner

U.S. Cl. X.R.

23—231; 73—61; 210—491